UNITED STATES PATENT OFFICE.

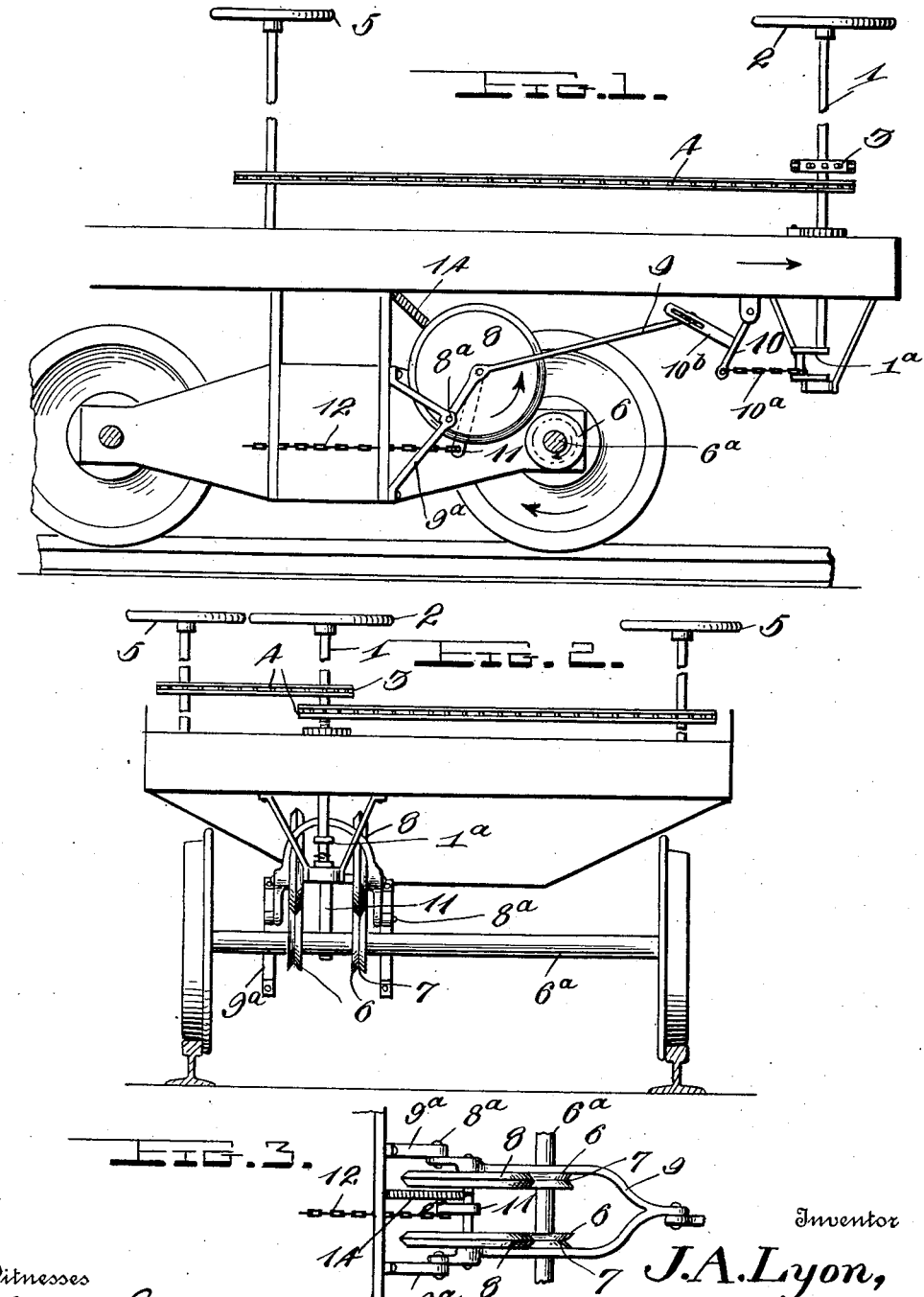

JOTHAM A. LYON, OF WEBSTER CITY, IOWA.

SAFETY-BRAKE.

1,033,428.  Specification of Letters Patent.  Patented July 23, 1912.

Application filed October 25, 1911. Serial No. 656,594.

*To all whom it may concern:*

Be it known that I, JOTHAM A. LYON, a citizen of the United States, residing at Webster City, in the county of Hamilton and State of Iowa, have invented certain new and useful Improvements in Safety-Brakes, of which the following is a specification, reference being had to the accompanying drawings.

This invention comprehends certain new and useful improvements in railway brakes, and the invention has for its primary object an improved construction of friction actuated brake mechanism, whereby the car equipped with the brake actuating devices, may be quickly brought to a standstill, while at the same time, the parts are so arranged that liability to breakage will be reduced to a minimum.

With this and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing in which, Figure 1 is a side elevation of a portion of a car equipped with my improved brake actuating device or mechanism. Fig. 2 is an end view thereof, and, Fig. 3 is a plan view of the friction disks employed, together with their correlated parts.

Corresponding and like parts are referred to in the following description and designated in the accompanying drawings by like reference characters.

In carrying out my invention, I provide any desired number of vertically disposed brake actuating rods 1, the same being illustrated in any desired position on the car, whereby the brakes may be actuated from different points. One of these brake rods is provided at its upper end with a hand wheel 2 so that it may be easily manipulated, the other rods being similarly provided with hand wheels designated 5 and being operatively connected to the first named brake rod by means of sprocket gears 3 and chains 4, as clearly illustrated in Figs. 1 and 2. The brake rod which is provided with a hand wheel 2, is provided at its lower end with a crank $1^a$, to which a chain $10^a$ is connected, said chain being secured to a lever 10 which is fulcrumed at its upper end on a bracket secured to the floor or bottom of the car, as best illustrated in Fig. 1, and which is provided with an arm $10^b$. The arm $10^b$ has a pin and slot connection with a link rod 9, said link rod being bifurcated, as best illustrated in Fig. 3, and having its forked end pivotally connected to laterally spaced brackets $9^a$ secured underneath the car.

Preferably, the frame formed by the bifurcated end of the link 9 is of angular formation, as clearly indicated in Fig. 1, and carries at the angle of the members of the forked portion, a shaft $8^a$ which supports friction disks 8. These disks are preferably formed with beveled peripheries designed for engagement with the grooved peripheries 7 of relatively small friction disks 6 secured to one of the axles $6^a$ of the car. The shaft $8^a$ carries a crank arm 11 which is connected to a chain 12 and which is adapted to pull the same so as to cause the brakes to be applied to the wheels of the car in order to stop the latter. The parts are held in a relatively inoperative position by means of a contractile spring 14 secured at one end to the shaft $8^a$ and at its other end to some stationary portion of the car.

From the foregoing description in connection with the accompanying drawings, the operation of my improved brake actuating mechanism will be apparent. In the practical use of the device, when it is desired to apply the brakes, one of the vertically disposed brake rods is actuated, and hence, the chain $10^a$ will pull upon the lever 10, and the arm $10^b$ of said lever as it swings downwardly and forwardly, will pull forwardly and downwardly upon the link rod 9 so as to swing disks 8 forwardly and downwardly into frictional engagement with the disks 6. The frictional engagement between the disks will cause the shaft $8^a$ to rotate or turn and the crank arm 11 will thus be caused to pull upon the chain 12 and apply the brake. By avoiding the use of beveled gears, it will be understood that all liability of breaking the parts will be avoided, as the frictional engagement will permit the parts to slip, before they are strained to the breaking point.

What I claim is:—

1. A brake actuating mechanism of the character described, including laterally spaced brackets, a support therefor, a link rod pivotally mounted at one end on said brackets, a lever, a support for said lever, the lever being provided with an arm pivotally connected to the other end of the link rod, a shaft carried by the link rod, a friction disk mounted on said shaft, a complementary friction disk carried by the car axle with which the first named friction disk is designed to engage, a crank arm carried by the shaft, for the purpose specified, and a spring operatively connected to the shaft, substantially as set forth.

2. The combination with a car, including an axle, of disks secured to said axle and movable therewith, brackets carried by the car in laterally spaced relation to each other, a link rod formed with a bifurcated end pivotally connected to said brackets, a transversely extending shaft carried by the bifurcated end of the link rod, a crank arm mounted on said shaft, a chain connected to said crank arm, for the purpose specified, a spring connected to said shaft and to a stationary portion of the car, disks carried by said shaft and arranged for engagement with the first named disks, a lever fulcrumed underneath the car and provided with an arm pivotally connected to the opposite end of said link rod, a chain operatively connected to said lever to move the same, and a vertically disposed brake rod operatively connected to said last named chain.

In testimony whereof I hereunto affix my signature in the presence of two witnesses.

JOTHAM A. LYON.

Witnesses:
FRANK W. PRIESTLEY,
WALTER FENELL.

---

Copies of this patent may be obtained for five cents each, by addressing the " Commissioner of Patents, Washington, D. C."